June 9, 1925.
A. C. BYRUM
HAND CULTIVATOR
Filed March 22, 1923
1,541,113
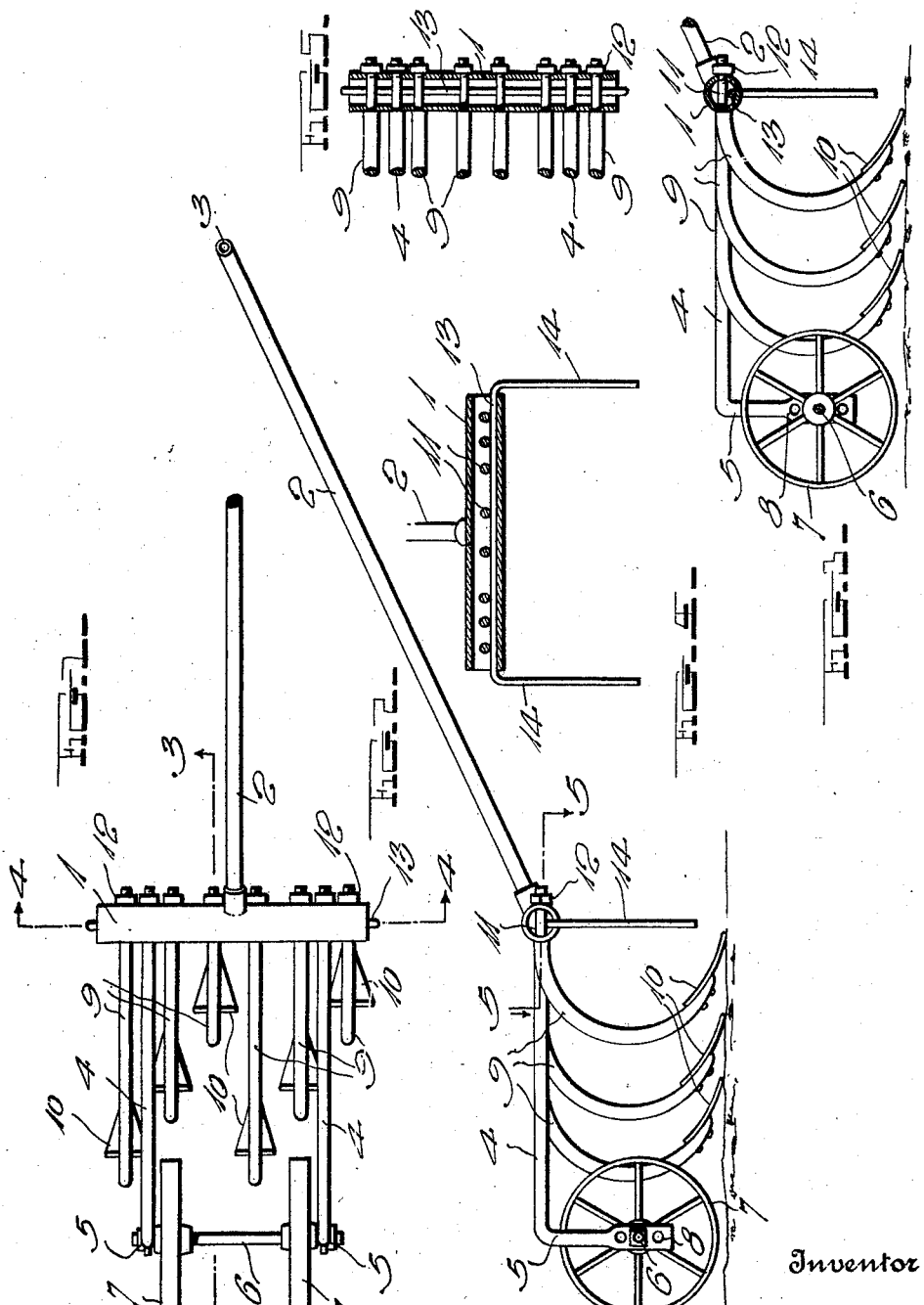
Inventor
A. C. BYRUM
Witness
H. Woodard
By H. R. Willson &co
Attorneys Patented June 9, 1925.

1,541,113

UNITED STATES PATENT OFFICE.

ALMON C. BYRUM, OF STOCKTON, ILLINOIS.

HAND CULTIVATOR.

Application filed March 22, 1923. Serial No. 626,958.

*To all whom it may concern:*

Be it known that I, ALMON C. BYRUM, a citizen of the United States, residing at Stockton, in the county of Jo Daviess and State of Illinois, have invented certain new and useful Improvements in Hand Cultivators; and I do declare the following to be a full, clear, and exact description of the invention, such as will enable others skilled in the art to which it appertains to make and use the same.

My invention has for its object to provide a simple and inexpensive, yet a highly efficient and desirable hand cultivator which may be operated by pulling, rather than pushing, as the cultivating operation may thus be much more easily performed.

In carrying out the above end, a transverse horizontal bar is provided with a forwardly extending rigid handle, a pair of beams extend rearwardly from said bar, and are rigid with respect thereto, the rear ends of said beams being provided with supporting wheels, and additional beams carrying earth working blades also extend rigidly rearward from said bars, it being a further object of the invention to provide said bars with a unique form of guard to turn the foliage of the plants being cultivated outwardly away from the cultivator teeth, said guards also serving to guide the cultivator if unplanted garden space is being conditioned for planting.

With the foregoing in view, the invention resides in the novel subject matter hereinafter described and claimed, the description being supplemented by the accompanying drawing.

Figure 1 is a plan view.

Figure 2 is a side elevation.

Figures 3 and 4 are detail sectional views on lines 3—3 and 4—4 of Fig. 1.

Figure 5 is a detail horizontal section on line 5—5 of Fig. 2.

In the drawing above briefly described, the numeral 1 designates a one-piece transverse horizontal bar which is provided with a rigid forwardly inclined handle 2 whose front end may well be provided with a transverse handle bar 3. A pair of beams 4 are secured to and extend rigidly rearward from the beam 1, the rear ends of said beams being downwardly bent as indicated at 5 and carrying an axle 6 upon which a pair of ground wheels 7 are mounted. Preferably, the downturned ends 5 of the beams 4, are flattened and provided with vertically spaced openings 8, permitting relative adjustment of the beams and the axle, to control the depth of cultivation, as will be hereinafter seen.

Also extending rearwardly from the bar 1, are a number of rigid beams 9 of different lengths, carrying earth-working blades 10, commonly known as cultivator teeth. It will be seen that by pulling the implement and holding the tongue or handle 2 at the proper elevation, the teeth 10 will work the soil. Furthermore, by vertically adjusting the axle 6, the depth at which the ground is cultivated, may be readily controlled.

Any desired means may be provided for rigidly securing the several beams 4 and 9 to the transverse bar 1, but I have shown these beams provided with reduced front ends 11 which pass through openings in said bar and have nuts 12 threaded on their terminals. If desired, the beams may be brazed or welded to the transverse bar to prevent possible turning, or other provision may be made for this purpose.

In the preferred form of construction, the bar 1 is tubular and the front ends 11 of the several beams pass diametrically across the interior of said bar. A horizontal rod 13 extends through the tubular bar, either above or below the beam ends 11 and frictionally contact with these parts to hold said rod in any position to which it may be turned. The ends of this rod are bent laterally as indicated at 14 and when swung downwardly, may be used as guards for the plants or as earth markers, as occasion may require. When the rod ends 14 or other arms with which the rod 13 may be provided, are swung upwardly, the frictional engagement of said rod with the interior of the tubular bar 1 and the beam ends 11 will hold said arms in raised position. This frictional contact also will hold the arms in the proper lowered positions for operation.

As excellent results may be obtained from the details disclosed, these details may be followed if desired. However, within the scope of the invention as claimed, numerous minor changes may be made.

I claim:

A hand-operated implement comprising a transverse horizontal bar, a pair of spaced beams extending rigidly rearward from said bar and provided at their rear ends with ground wheels, a plurality of additional beams extending rigidly rearward from said bar on opposite sides of said spaced beams and carrying earth working blades, said blades being arranged in advance of said wheels and a rigid tongue extending forwardly from said bar for pulling the implement.

In testimony whereof I have hereunto affixed my signature.

ALMON C. BYRUM.